United States Patent

[11] 3,602,943

[72] Inventors Bernard Neuville
Versailles;
Claude Ledoux, Massy; Raoul Hess,
Chatillon-Sous-Bagneux, all of, France
[21] Appl. No. 837,117
[22] Filed June 27, 1969
[45] Patented Sept. 7, 1971
[73] Assignee Produits Chimiques Pechiney-Saint-Gobain
Neuilly-sur-Seine, France

[54] PLASTIC EXTRUSION MACHINE
12 Claims, 6 Drawing Figs.
[52] U.S. Cl. .................................................... 18/12 C,
18/12 SE
[51] Int. Cl. ..................................................... B29f 3/00
[50] Field of Search ........................................ 18/12 C, 12
DR, 12 SE

[56] References Cited
UNITED STATES PATENTS
| | | | |
|---|---|---|---|
| 3,046,603 | 7/1962 | Maxwell .......................... | 18/12 (C) X |
| 3,153,686 | 10/1964 | Adams ........................... | 18/12 (C) X |
| 3,308,505 | 3/1967 | Bearer et al. ................... | 18/12 C UX |

*Primary Examiner*—H. A. Kilby, Jr.
*Attorney*—McDougall, Hersh, Scott & Ladd

ABSTRACT: Apparatus for extruding plastic materials which includes a housing having a stator, a rotor in the form of a plate arranged in face-to-face relation with the stator to define a gap between the rotor and the stator, an extrusion opening axially through the rotor, means to rotate the rotor relative to the stator, an annular channel defined by the housing and means to sweep the volume of the annular channel whereby plastic is displaced toward the extrusion opening.

FIG. 3
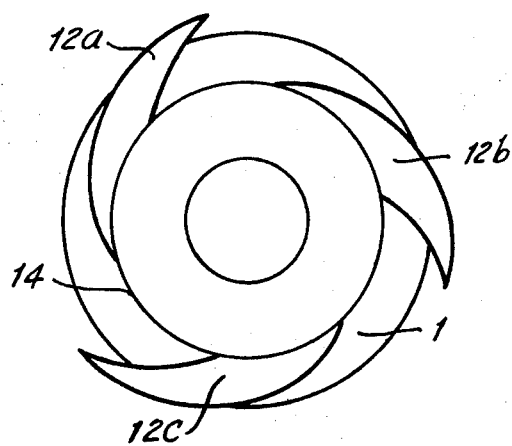
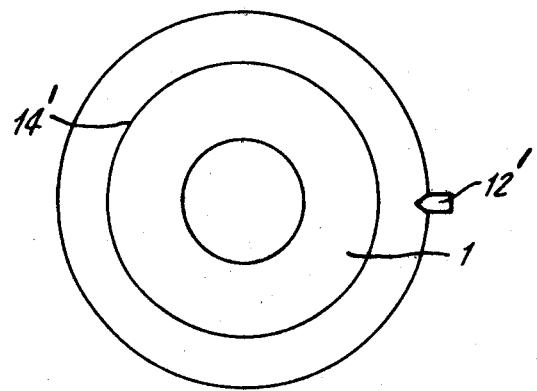
FIG. 4

PLASTIC EXTRUSION MACHINE

This invention relates to a rotating plate extruder and more particularly to a rotating plate extruder having improved means to feed the material to be extruded to the extrusion orifice.

To avoid certain disadvantages inherent in conventional single-screw extruders, apparatus which makes use of a "normal force effect" sometimes referred to as the "Weissenberg effect" has been developed. This effect, which is used for the extrusion of thermoplastic materials, is developed by the use of an apparatus having at least two parallel surfaces with a space therebetween into which the thermoplastic material is introduced. One of the surfaces is held stationary while the other is rotated relative thereto about an axis perpendicular to the surfaces, with an opening through the fixed surface through which the plastic material extrudes.

In U.S. Pat. No. 3,364,522, issued Jan. 23, 1968, and entitled "Plastic Extrusion Machine," description is made of a device of the type described which is adapted for the extrusion of thermally unstable polymers and particularly unplasticized polyvinyl chloride. As described in the aforementioned patent, the device is formed with a cavity that is eccentric to the rotating plate or rotor and which has a plurality of curvilinear deflector blades extending therein from one or the other or both of the surfaces to enhance homogenization of the thermoplastic material as well as its rapid displacement, while the plastic state, toward the extrusion opening whereby to void thermal degradation of the resin. In U.S. Pat. No. 3,411,180, granted Nov. 19,1968, and entitled "Plastic Extrusion Machine,38 description is made of an improvement in the apparatus of the type described in which chamfers are provided in the peripheral portions of the rotor and the stationary disc plate or stator, with the chamfered portions having an interfitting relationship or nesting relationship therebetween to enable relative rotational movement without friction but with minimum clearance. This improvement permits use of the apparatus for extrusion of unplasticized polyvinyl chloride through die openings of small cross section, as in the production of filaments and the like.

In copending application Ser. No. 759,087, filed Sept. 11, 1968, and entitled "Improvement in Extruders with Rotating Plate, 38 description is made of an extruder having a rotating plate in which at least one of the faces of the plates is formed with grooves extending tangentially to a circle concentric with the axis of the plate. This improvement allows the use of the apparatus for extrusion of polymers containing lubricant wherein it is possible to extrude at higher temperatures and/or to obtain better homogenization and/or to improve the flow and ease of shaping of the material to the desired product.

In copending application Ser. No. 764,860, filed Oct. 3, 1968, and entitled "Improvement in Rotating Plate Type Extruders," description is made of a rotating-plate-type extruder in which the surface in the central axial portion of at least one of the plates is recessed to increase the width of the gap between the plates in communication with the extrusion opening.

Difficulties have been experienced in the use of such apparatus for the extrusion of some polymers, especially polyvinyl chloride without experiencing a perceptible amount of degradation and/or choking of the apparatus. The rapid gelling of the resin to be extruded is often a cause of a feed disturbance in that the rotating plate does not empty the feed hopper at a sufficient rate, with the result that the extruder becomes clogged o choked.

It is an object of the present invention to provide an extruder with improved feeding means which overcomes the foregoing deficiencies.

It is another object of the present invention to provide means to insure the rapid and uniform progression of the material to be extruded toward extruder orifice.

These and other objects and advantages of the invention will hereinafter appear and for purposes of illustration, but not of limitation, embodiments of the invention are shown in the accompanying drawings in which:

FIGS. 3 and 4 are top views of FIG. 1 except that they show alternative arrangements for rotor blades;

Figure 1:
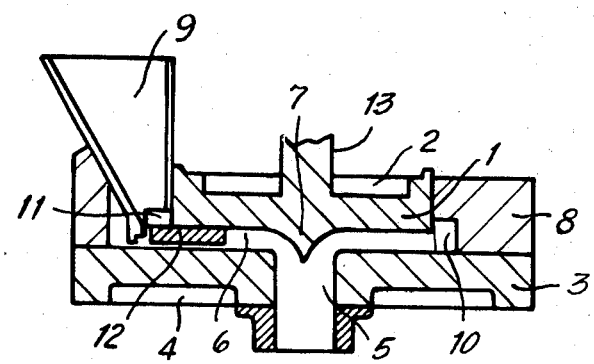
FIG. 1 is a view in axial section of one embodiment of the present invention.

The improvement of the present invention resides in providing an extruder which has an annular channel circumscribing the space or gap between the plates and which is concentric with and communicates with the space between the plates, and means fixed on the inner surface of the rotating plate to sweep the volume of the annular channel.

In accordance with one embodiment of the present invention, the annular channel lies in substantially the same plane as the fixed plate or stator and is bounded at its bottom by the plane of the stator The outer sidewall of the channel is a cylindrical surface defined by the housing surrounding the rotor, and the inner side is bounded by the space between the plates. The upper portion of the annular channel is bounded either by the plane of the interior surface of the rotor or by a helicoid, the maximum height of which is on one side of the hopper adjacent thereto and decreases in the direction of rotation of the rotating plate to a minimum height equal to the distance between the plates on the other side of the hopper.

The width of the annular channel along an extended radius of the rotor is preferably n greater than the radius of the rotor, and generally is two to five times the distance between the plates. The maximum height of the annular channel along the axis of the rotor generally depends upon the ratio between the apparent density of the material to be extruded at the inlet to the apparatus and the apparent density after extrusion. It is generally preferred that the maximum height be between one and three times the distance between the plates.

Another feature of the present invention relates to the lower portion of the hopper which supplies resin to be extruded to the annular channel. The lower portion of the hopper, the width of which is approximately the same as the width of the annular channel, is closed by a horizontal plate, but is provided with the side and opening or window, preferably in a plane passing through the rotor axis to permit the material to be treated to flow in the direction of rotation of the rotating disc. In embodiments in which the annular channel is bounded at its top portion by a helicoid and thus has a decreasing height, it is generally preferred to set the height of the window at a level corresponding to the difference between the maximum and minimum heights of the channel. In embodiments where the channel has a constant vertical height, there is generally provided a recess in the channel to permit flow of the material to be extruded from the hopper into the annular channel. The lower portion of the window formed at the bottom of the hopper is preferably in the plane of the internal surface of the rotation plate.

Another feature of the present invention resides in the use of a plurality of deflecting blades which are movable through the annular channel about at least one fixed point or crown. It is generally preferred that the blades be integral with the rotor.

The blades are preferably fixed to the internal surface of the rotating plate and can be integral therewith, and also can be connected to each other to form one integral blade. The blades and the internal surface of the stator have a profile such that the material to be extruded is displaced to the space between the plates. When rotated, the blades scrape the material on the bottom of the annular channel and simultaneously exert a centripetal force on the material displacing it toward the extrusion orifice, thereby continuously clearing the feed hopper. The rotating plate may be provided with any number of blades, although it is preferred to embody a rotor having three to six blades. It has been found that it is possible to increase by 30 percent the feed-flow capacity of the extruder by increasing the number of blades from three to six.

The vertical height of the annular channel should be sufficient to permit the passage of the blades of each of the crowns mounted on the rotary plate. When there is more than one crown on the rotary plate, it is generally preferred that the crowns be spaced at a distance equal to the thickness of the fixed crown located between them so that there will be no substantial overlap in the volume swept by the blades of each crown. The vertical height of the annular channel adjacent the space between the plates may be reduced if desired to a dimension corresponding to that of the space between the plates.

Referring now to the drawing for a description of a discplate extruder embodying the features of the invention, there is shown in FIG. 1, a plate 1 or rotor adapted to be rotated in a horizontal plane about a vertical axis and which has conventional heating means, such as hollowed channels or passages 2 for circulation of a thermostatically controlled heat-transfer fluid, on its outer surface. Positioned in a face-to-face parallel relation to rotor 1 is a fixed plate or stator 3 which forms the lower portion of the extruder and which is similarly provided with conventional heating means 4. The stator has an orifice 5 at its center through which a polymer may be extruded. Rotor 1 is preferably mounted above stator 3 such that the axis of the rotor is coincident to the center of opening 5 and such that the inner horizontal surfaces define a space or gap 6 therebetween. Rotor 1 is mounted to be rotatable relative to stator by conventional means (not shown) attached to shaft 13. The interior surface of the rotor may be provided with various relief elements, such as grooves as disclosed in copending application Ser. No. 759,087, and/o an axial protuberance or crown 7 depicted in the drawing.

Circumscribing rotor 1 and gap 6 is an annular housing or ferrule 8 in which the rotor is adapted to be rotated with a minimum clearance such that the rotor will not generate substantial friction when the device is empty. Ferrule 8 is provided with an opening into which a feed hopper 9 or the like may be positioned. Feed hopper 9 is closed at its bottom, but is provided with a small window 11 through which the material to be extruded can flow from the hopper to the annular channel in the direction of rotation of the rotor.

Ferrule 8 also defines an annular channel 10 which is located around the circumference of gap 6 and communicates therewith. On the inner surface of rotor 1, there is provided at least one blade 12 which protrudes into annular channel 10. Adjacent and on one side of hopper 9, annular channel 10 has a maximum vertical height corresponding to the sum of the vertical distance between rotor 1 and stator 3 and the vertical height of the hopper window. The height of annular channel 10 diametrically opposite the hopper (shown on the right in FIG. 1) falls between the maximum height and the minimum height, which corresponds to the height of the space between the plates on the other side of the rotor.

In accordance with this embodiment, as rotor 1 having blade 12 fixed thereon is rotated, blade 12 scrapes the material on the inter surface of stator 3 and displaces it toward the extruder orifice 5. As blade 12 rotates from the window of the hopper, it approaches the inner surface of rotor 1 to thereby continuously empty the hopper, and displace place the material toward orifice 5.

It will be understood that the height of the annular channel 10 may be a constant. In this embodiment, the distance between the bottom of the blade and the inner surface of rotor 1 remains constant.

Figure 2:
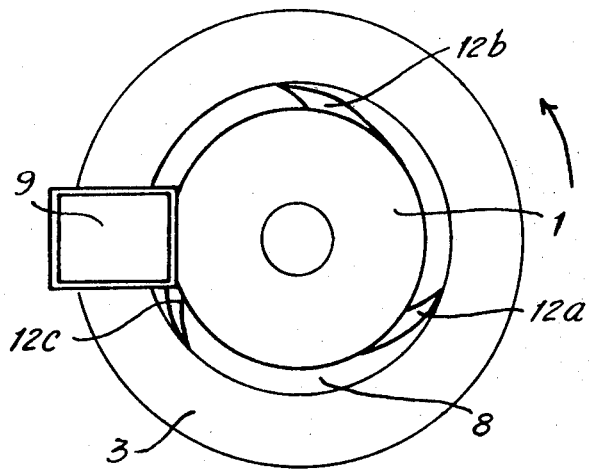
FIG. 2 is a top view of the device shown in FIG. 1 after the rotor housing has been removed.

FIG. 2 is a top view of the apparatus shown in FIG. 1, after housing 8 has been removed. It will be seen that a plurality of blades 12a, 12b, and 12c are mounted on rotor 1 and extend into annular channel 10.

FIG. 3 depicts the internal surface of rotor 1 as viewed from inside the extruder. It is generally preferred that blades 12a, 12b, and 12c have a fin-shaped arcuate configuration as depicted in this figure so that they will impart a centripetal component to the forces acting upon the material to be extruded to cause it to move toward the die orifice. It will also be seen that the blades are mounted on a cylindrical projection or crown 14' which is an integral part of rotor 1.

FIG. 4 is a variation of the embodiment depicted in FIG. 3, wherein at least one single cylindrical rod 12' affixed to crown 14' which is integral with rotor 1 and is used in lieu of the fin-shaped blades.

It will be understood that various modifications may be applied to the apparatus from the scope of the invention. For example, it is possible to use blades of other configurations which similarly exert a centripetal force upon the material to be extruded. It is likewise possible to replace feed hopper 9 by a plurality of hoppers or by a single annular hopper communicating with annular channel 10 by several openings An extruder of the type described above may also be adapted for use with a horizontal axis by positioning the feed hopper on the stator rather than on the housing. In such an extruder one of the faces of the annular channel is preferably coplanar with the inner surface of the rotor, and the other helicoidal face is hollowed out of the face of the stator.

Figure 5:
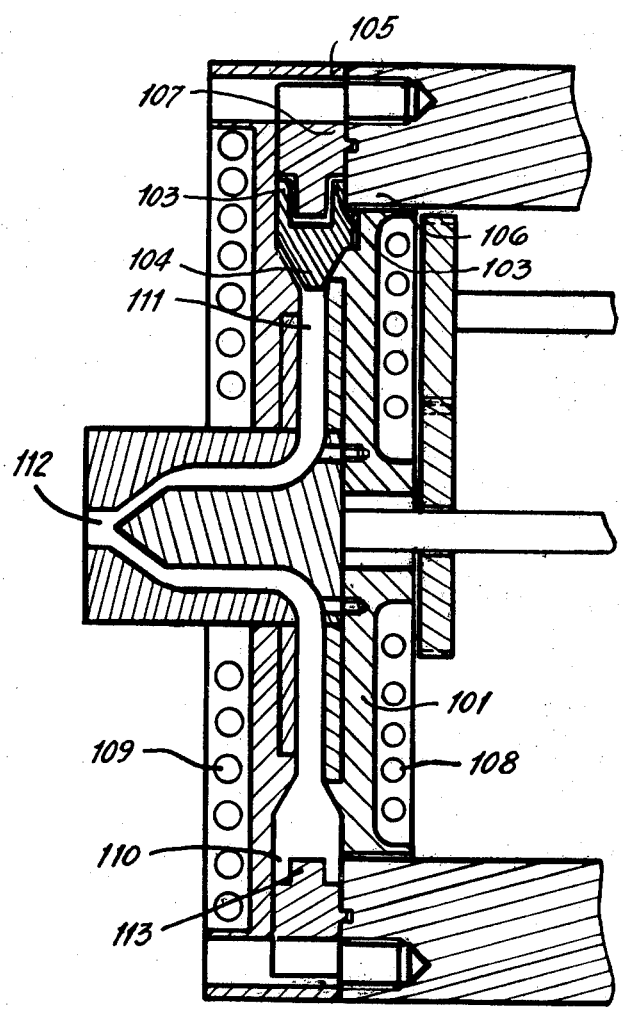
FIG. 5 is a view in axial section of another embodiment of the present invention; and, FIG. 6 is a sectional view of the embodiment shown in FIG. 5 taken in a plane perpendicular to the axis of the rotating plate.

Another embodiment of the present invention is depicted in FIG. 5 wherein the extruder is shown as having a horizontal axis. There is provided a rotor 101 having heating means 108, such as passages, for the circulation of a thermostatically controlled heat-transfer fluid and having cavities around its circumference for mounting a plurality of blades 102, each of which is comprised of two blade elements 103 and a base 104 adapted to fit the cavity.

A stator 105, also having heating means 109, is positioned in a face-to-face parallel relation with rotor 101 so as to define an airspace or gap 111 between the plates. Rotor 101 is adapted to be rotated relative to stator 105 by conventional means such as a gearbox and motor (not shown in the drawing) . The stator is provided with opening 112 at its center through which material may be extruded. About the periphery of the inner surface of the rotor and communicating with space 111, there is an annular channel 110 which is defined by the surfaces of a housing or support 106 an fixed crown 107, both of which are integral with stator 5, as well as the inner surface of stator 5. As is shown in this figure, a portion 113 of fixed crown 107 extends into annular channel 110 and the blades 2 sweep the annular channel on both sides of projection 113 of fixed crown 107. As the blades are rotated with the rotor, they sweep the volume of the annular channel but have sufficient clearance so that they do not generate substantial friction when the device is empty.

The profile or fixed crown 107 can be circular, but is generally preferred that it be helical whereby the distance of the face of fixed crown 107 from the axis of the rotor is at a maximum on one side of the feed hopper (which can be mounted on stator 5 but is not illustrated in the drawing) and decreases in the direction of rotation to a minimum on the other side of the feed hopper.

In accordance with this embodiment, the material to be extruded is displaced toward the center of the stator by the rotating blades and by the fixed crown, the surface of which the blades approach as they rotate from the feed-hopper outlet toward the opposite side of the hopper. If desired, the interior surfaces of the rotor and stator may be provided with various relief elements such as blades, nozzles, screws, or propellors or simply an axial protuberance depicted as 112 in the drawing.

Figure 6:
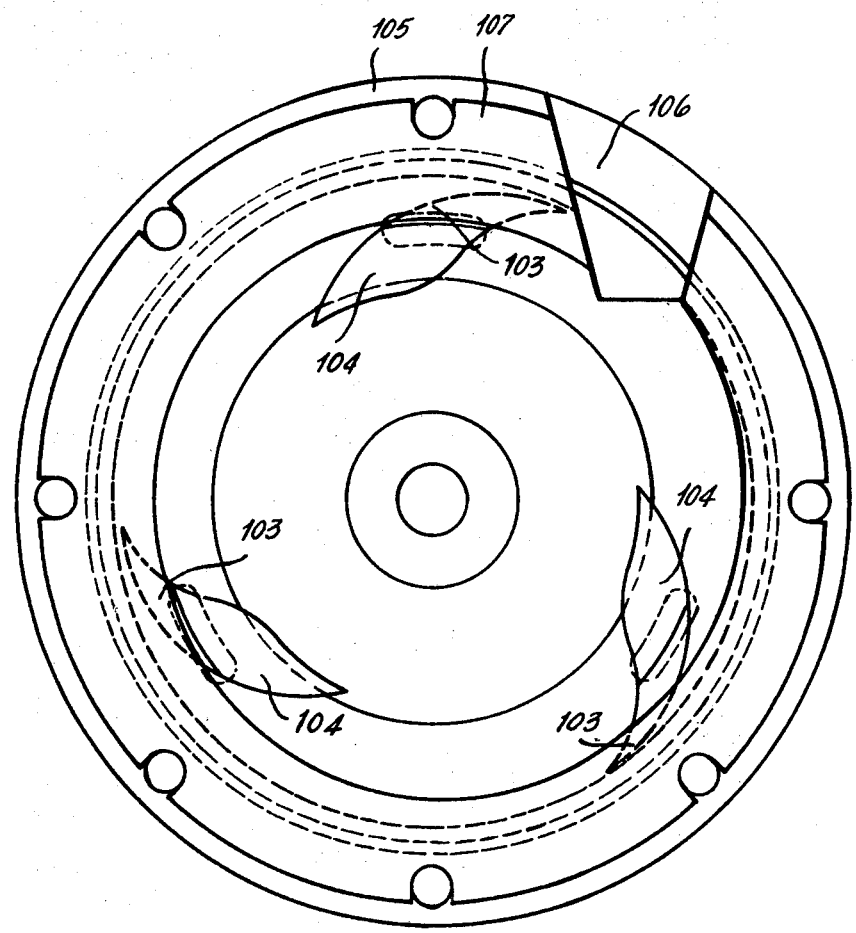

FIG. 6 illustrates the position of the blades in the device shown in FIG. 5. It will be noted that the blades are arcuate and are disposed at an angle to impart a centripetal force to the material to be extruded. The top portion of fixed crown 107 with a helical profile and its relation to hopper 116 is more clearly illustrated in this figure.

It will be understood by those skilled in the art that the apparatus of this embodiment can similarly be adapted for use with an extruder having a vertical axis.

In order to illustrate the effects and the advantages of an extruder according to the present invention, reference is made to the following nonlimiting examples.

EXAMPLE I

A vertical extruder of the type shown in FIG. 1 is formed of a rotating plate having a diameter of 180 mm. The concentric annular channel circumscribes this plate and has a horizontal or radial width of 10 mm. and a height in the direction of rotation of the rotor of 22 mm. adjacent the window of the hopper and 5 mm. on the opposite side of the hopper. The lower base of the channel is the inner stator surface and the space between the plates is 5 mm. On the lower face of the rotor there is located a cylindrical-shaped lug, the diameter of which is slightly less than the gap between the plates. This lug lies in a horizontal plane and is 32 mm. in length, of which 9.8 mm. extends into the annular channel. The rotor has a smooth surface except for this lug and an axial frustoconical crown of 20 mm., the base of which is 60 mm. in diameter and which bears three blades. The stator surface bears four blades, one end of each blade is located 86 mm. from the center and the other one is located 62 mm. from this center. A cylindrical die is located on the same axis as the rotor and has a diameter of 8 mm.

The extruder is provided with a hopper which feeds the annular cavity through a horizontal rectangular opening 40 mm. in length and 10 mm. in width.

The extruder is started by rotating the rotor at a rate of 65 r.p.m. , and the temperature is the gap between the plates is raised to 180° C. by means of the heating elements on the plates. Polyvinyl chloride, having a viscosity number AFNOR of 80 (corresponding to a K value of 57 ) stabilized by 2 parts of tin thioglycolate per 100 parts by weight of polymer, is introduced through the feed hopper. The resulting extruded rod is formed at the rate of 15 kg. per hour and is found to be irregular and having incompletely gelled zones.

EXAMPLE II

The extruder utilized in Example I is utilized in this example, except that the rotor lug is replaced by three blades having the profile shown in FIG. 3. These blades have a length and a height such that they sweep the gap between the planes and the annular channel. The blades are mounted upon a crown 136 mm. in diameter which is affixed to the surface of the rotor. The output of the apparatus using the same resin as is used in Example I is 19.3 kg. per hour. It is noted that fewer zones resulting from incomplete gelling are observed in the rod.

EXAMPLE III

The extruder in Example II is used in this example, except that the hopper is modified by closing the bottom and by providing a side opening having a width of 10 mm. and a height of 17 mm. on the side facing the direction of rotation of the rotor. it is found that a transparent rod of the resin utilized in Example I may be extruded continuously and with increased regularity at a rate of 27.7 kg. per hour.

EXAMPLE IV

An extruder of the type described in FIGS. 5 and 6 is provided with a rotor having a diameter of 210 mm. and a gap dimension of 6 mm. The axial dimension of the annular channel is 23 mm. and the distance from the face of the fixed crown to the machine axis ranges from 11.2 mm. on one side of the hopper to 9.9 mm. in the direction of rotation at the other side of the hopper.

The internal surfaces of both the rotor and stator are each provided with two blades which serve to sweep the gap therebetween. The axis of the rotor is provided with a nozzle without blades.

In the operation of this apparatus, the rotor is rotated at a rate of 65 r.p.m. and the temperature of the plates is maintained at 180°C. The space between the plates is fed with polyvinyl chloride powder having viscosity number AFNOR of 80 stabilized by 2.5 parts of tin thioglycolate per 100 parts by weight of polymer.

The extrusion flow obtained is 60 kg. per hour, but is reduced to 25 kg. per hour by removing the blades from the rotor.

This example, in which no extrusion pressure is required since there is no die, demonstrates the difference in the feed capacities of both systems.

EXAMPLE V

The operation of Example IV is repeated except that a rod die having a diameter of 4.5 mm. is added to the extruder, and is heated to 120° C. The flow of the extended rod when the rotor is provided with blades is 28 kg. per hour as compared to 24 kg. per hour when the blades of the rotor are removed.

This example illustrates that the use of an extruder having blades provides a pressure greater than that obtained without the use of such blades.

EXAMPLE VI

In this example, the extruder used in example V is used except that the extruder nozzle was replaced by two blades. The flow of the extruded rod is 33 kg. per hour using blades on the rotor and 24 kg. per hour in the case of the apparatus without such blades.

It will be apparent from the foregoing that the present invention provides an improvement in the feed system of rotary plate extruders. It will be further apparent that the use of the invention results in feed capacities which were hitherto unobtainable with prior art type rotary plate extruders.

It will be understood that changes may be made in the details of construction, arrangement, and operation without departing from the spirit of the invention, especially as defined in the following claims.

We claim:

1. In an extruder including a housing having a stator, a rotor mounted for rotation in the form of a plate arranged in face-to-face relation with said stator to define a gap between said rotor and said stator, an extrusion opening axially through said stator, and means for feeding material to said extruder, the improvement comprising an annular channel defined in said housing, said channel being outside the periphery of said gap and communicating therewith, and deflector means mounted on said rotor and extending radially and outwardly therefrom to sweep the volume of said channel.

2. An extrude as defined in claim 1 wherein said channel is bounded by a surface of said stator and by a helicoidal surface defined by a surface of said housing.

3. An extruder defined in claim 1 wherein said means for feeding material to said extruder communicates with said channel.

4. An extruder as defined in claim 3 wherein said means for feeding material to said extruder is at least one hopper, said hopper having a closed bottom and having a window in one side thereof communicating with said channel.

5. An extrude as defined in claim 4 wherein said window lies in a plane passing through the axis of said rotor.

6. An extruder as defined in claim 5 wherein said channel is bounded by a helicoidal surface defined by the surface of said housing whereby the maximum height of said channel corresponds to the height of said window plus the axial dimension of said gap and the minimum height of said channel corresponds to the axial dimension of said gap.

7. An extruder as defined in claim 1 wherein the axial dimension of said channel is the axial dimension of said gap.

8. An extruder as defined in claim 1 wherein the axial dimension of said channel adjacent said means for feeding said extruder is from 1 to 3 times the axial dimension of said gap and the axial dimension of said channel on the other side of said means for feeding said extruder in the direction of rotation of said rotor is equal to the axial dimension of said gap.

9. An extruder as defined in claim 1, wherein the radial dimension of said channel is 2 to 5 times the axial dimension of said gap.

10. An extruder as defined in claim 1 wherein the periphery of said channel is bounded by the surface of a fixed crown extending radially inwardly into said channel.

11. An extruder as defined in claim 11 wherein said crown has a helical profile

12. An extruder as defined in claim 1 wherein said means to sweep said channel comprises at least one blade mounted for rotation on said rotor.

UNITED STATES PATENT OFFICE
CERTIFICATE OF CORRECTION

Patent No. 3,602,943              Dated September 7, 1971

Inventor(s) Bernard Neuville, Claude Ledoux, Raoul Hess

It is certified that error appears in the above-identified patent and that said Letters Patent are hereby corrected as shown below:

column 1, line 29, change "whereby" to "thereby";

column 1, line 30, change "void" to "avoid"

column 1, lines 32 and 44, omit the numeral "38"

column 1, line 49, change "wherein" to "whereby"

column 1, line 67, change "o" to "or"

column 2, line 34, change "n" to "no"

column 2, line 47, change "the" to "a"

column 3, line 33, after "stator" insert "3"

column 4, line 14, after "apparatus" insert "described in the foregoing figures without departing"

column 4, line 44, change "an" to "and"

column 4, line 53, change "or" to "of"

column 5, line 33, change "is" to "in"

column 5, line 59, change "it" to "It"

column 6, line 17, change "120°" to "190°"; same line, change "extended" to "extruded"

Claim 2, line 1, change "extrude" to "extruder"

Signed and sealed this 21st day of March 1972.

(SEAL)
Attest:

EDWARD M. FLETCHER, JR.
Attesting Officer

ROBERT GOTTSCHALK
Commissioner of Patents